Patented Oct. 12, 1954

2,691,610

UNITED STATES PATENT OFFICE 2,691,610

COMPOSITION OF MATTER, METHOD OF EMBEDDING AN ELECTRICAL ELEMENT THEREIN, AND THE ARTICLE PRODUCED THEREBY

Henry Drummond, Lorne Park, Ontario, Canada

No Drawing. Application April 2, 1951,
Serial No. 218,897

3 Claims. (Cl. 154—43)

This invention relates to an electrical insulating material suitable for supporting and insulating electrical apparatus.

Numerous materials are known and are in common use which serve as insulating and supporting materials for electrical apparatus. These materials have numerous disadvantages. For example, some are relatively expensive, some require extreme heat in their preparation, some, which may be poured in plastic form, expand or contract excessively upon solidifying.

It is an object of this invention to provide an inexpensive material adaptable for mounting or supporting electrical apparatus which has good dielectric properties and which is prepared at relatively low temperatures.

It is a further object of this invention to provide an inexpensive material suitable for supporting and insulating electrical apparatus which may be poured in liquid form and which, upon setting, will not expand or contract appreciably.

This material comprises a mixture of ground calcium sulfate in the form generally referred to as powdered gypsum, ground silicon dioxide, commonly referred to as powdered silica, and powdered dextrin, which, as is well known, is an intermediate product between starch and the sugars into which starch hydroxylizes. These materials in pulverized form are mixed together in proportions of preferably approximately 60% gypsum, 30% ground silica and 10% dextrin. The powdered materials are intimately mixed together and then water is added to provide a material of free flowing fluid consistency. The fluid can be poured into molds or retainers in which electrical apparatus has been positioned and when dried will serve to mount the electrical apparatus in a rigid body of insulating and supporting material.

The drying process is preferably carried out as follows: The initial drying or "setting" of the material occurs at room temperature. After the material has set thoroughly it is preferably permitted to remain at room temperature for approximately twenty-four hours. Thereafter the set material is baked at an elevated temperature for a sufficient period of time to remove all of the free moisture from the material.

The baking temperature and the time after "setting" at which the temperature may be increased is controlled by two factors. First, the temperature may not be increased at either such a time or such a rate as to cause the escaping moisture to be of such a volume as to carry with it an appreciable amount of the water soluble dextrin, and deposit the dextrin on the surface of the material as the water evaporates, thus impoverishing the central or inner portion of the body of the material of dextrin. Secondly, baking at excessive temperatures in the later stages of the baking process will result in deterioration of the dextrin. Thus the rate of drying at the early stages of the drying process is limited to a rate which will not cause a displacement of the dextrin, and the baking temperature imposed during the later portion of the drying process is limited to a temperature which will not adversely affect the dextrin.

It will be evident that the time of baking and the time rate of increase in baking temperature will depend upon the thickness of the body of material being baked. Thus a definite time rate of temperature increase cannot be specified. The maximum temperature may not exceed a temperature which will adversely affect dextrin, namely, a temperature of approximately 180° F.

In this composition, the gypsum provides body, the silica provides dielectric properties and the dextrin serves as a binder. There is thus produced an insulating material suitable for the mounting of electrical apparatus. This suitability is particularly evidenced by the fact that among the characteristics of the finally baked material are good dielectric properties. By employing the silica and the dextrin in proper proportion in combination with a particular proportion of gypsum the material will neither expand nor contract to any appreciable extent upon drying.

While the material thus produced has good dielectric properties, it has a relatively porous structure and will absorb moisture. I have found that the material, after baking, may be coated with a layer of one of the heat stable organosilicon oxide polymers in liquid form of the class of materials which are generally referred to as silicones, or silicone varnishes or resins. This liquid silicone may be applied over the baked composition, and will provide a surface seal impervious to moisture and of high dielectric properties which will preserve the dielectric properties of the material as of the time the baking is completed.

A typical application of the material is in the mounting of gas filled glass sign tube elements, for example, of the type providing letters which may be interchangeably inserted in a sign mounting base or a portable type of gas tube sign such as may be carried by hand or mounted on highway trucks or railway cars. In these and other similar applications, the gas filled glass tube would be subjected to both impact and shock and to moisture, and therefore the mounting of the tube in a material which will provide support therefor and also have adequate moisture resistant dielectric properties is highly desirable. The fact that the material neither expands nor contracts appreciably on drying makes this mounting possible.

This material is particularly applicable in structures involving a positioning of a plurality of electrical elements in a confined space in which a mounting structure is required which will rigidly position the elements and have suitable dielectric properties to provide insulation between the elements.

While I have set forth as the most desirable proportions of the ingredients of my material 60% gypsum, 30% ground silica and 10% dextrin, it will be apparent that these proportions may be varied to some degree. However, compositions containing less than 55% gypsum have been found to be unsatisfactory in that they lack sufficient mechanical strength. Compositions having more than 65% gypsum have reduced dielectric properties due to the reduction in the amount of ground silica involved. The percentage of dextrin employed with a 30% ground silica composition should be preferably more than 5% and less than 15%. The preferable formula for any specific application includes the maximum possible amount of ground silica while providing a final product which has sufficient mechanical strength and does not expand or contract to any appreciable extent on drying.

What is claimed is:

1. The composition of material consisting essentially of approximately 55% to 65% powdered gypsum, approximately 20% to 40% powdered silicon dioxide and approximately 5% to 15% powdered dextrin, and sufficient water to render the mixture fluid, the constituents being in such proportion that, when mixed with water, there is substantially no change in the volume of the material during drying thereof.

2. An electrical element embedded in the composition of material consisting essentially of approximately 55% to 65% powdered gypsum, approximately 20% to 40% powdered silicon dioxide and approximately 5% to 15% powdered dextrin, and sufficient water to render the mixture fluid, the constituents being in such proportion that, when mixed with water, there is substantially no change in the volume of the material during drying thereof.

3. The method of making an electrical apparatus comprising the steps of forming a composition consisting essentially of approximately 55% to 65% powdered gypsum, approximately 25% to 40% silicon dioxide, approximately 5% to 15% powdered dextrin, admixing said composition with sufficient water to form a fluid mixture, positioning an electrical element in the fluid mixture whereby the composition, while in a fluid state before setting, is positioned around the element, the constituents being in such proportion that there is substantially no change in the volume of the composition during drying thereof, drying said composition to permit setting thereof, and thereafter baking the composition at such elevated temperatures as to substantially limit the amount of dextrin carried out of the body of the composition by escaping moisture and at a maximum temperature which will not adversely affect the dextrin.

References Cited in the file of this patent

UNITED STATES PATENTS

| Number | Name | Date |
| --- | --- | --- |
| 305,817 | Hickman et al. | Sept. 30, 1884 |
| 329,349 | Wiggins | Oct. 27, 1885 |
| 1,529,228 | Witty | Mar. 10, 1925 |
| 1,620,067 | Brookby et al. | Mar. 8, 1927 |
| 1,785,053 | Stodder | Dec. 16, 1930 |
| 2,007,315 | Turner | July 9, 1935 |
| 2,078,199 | King | Apr. 20, 1937 |
| 2,326,085 | Williams | Aug. 3, 1943 |
| 2,386,259 | Norton | Oct. 9, 1945 |
| 2,412,470 | Norton | Dec. 10, 1946 |

FOREIGN PATENTS

| Number | Country | Date |
| --- | --- | --- |
| 13,357 | Great Britain | of 1893 |

OTHER REFERENCES

Industrial Finishing, vol. 10, No. 4, February 1934, pp. 42 and 43.